(12) United States Patent
Pinero et al.

(10) Patent No.: US 8,172,533 B2
(45) Date of Patent: May 8, 2012

(54) TURBINE BLADE INTERNAL COOLING CONFIGURATION

(75) Inventors: Sandra S. Pinero, Middletown, CT (US); Edward F. Pietraszkiewicz, Southington, CT (US); Bryan P. Dube, Columbia, CT (US); Stephen J. Yee, Manchester, CT (US); Ryan Shepard Levy, Middletown, CT (US); Mohamed Hassan, Glastonbury, CT (US); Domenico Valerio, Waterbury, CT (US); Scott D. Hartmann, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1029 days.

(21) Appl. No.: 12/152,372

(22) Filed: May 14, 2008

(65) Prior Publication Data

US 2009/0285684 A1 Nov. 19, 2009

(51) Int. Cl.
F01D 5/08 (2006.01)
F01D 5/18 (2006.01)

(52) U.S. Cl. ..... 416/97 R; 415/115; 415/116; 416/90 R; 416/92; 416/96 R

(58) Field of Classification Search ................. 415/115, 415/116; 416/97 R, 90 R, 92, 96 R
See application file for complete search history.

(56) References Cited

U.S. PATENT DOCUMENTS

| | | | |
|---|---|---|---|
| 5,156,526 A | 10/1992 | Lee et al. | |
| 5,348,446 A | 9/1994 | Lee et al. | |
| 5,387,085 A * | 2/1995 | Thomas et al. | 416/97 R |
| 5,387,086 A | 2/1995 | Frey et al. | |
| 5,403,159 A * | 4/1995 | Green et al. | 416/97 R |
| 5,591,007 A * | 1/1997 | Lee et al. | 416/97 R |
| 5,660,524 A | 8/1997 | Lee et al. | |
| 5,669,759 A | 9/1997 | Beabout | |
| 5,700,131 A | 12/1997 | Hall et al. | |
| 5,931,638 A * | 8/1999 | Krause et al. | 416/97 R |
| 5,967,752 A | 10/1999 | Lee et al. | |
| 6,019,579 A | 2/2000 | Fukuno et al. | |
| 6,036,440 A | 3/2000 | Tomita et al. | |
| 6,099,252 A | 8/2000 | Manning et al. | |
| 6,126,396 A | 10/2000 | Doughty et al. | |
| 6,139,269 A * | 10/2000 | Liang | 416/97 R |
| 6,206,638 B1 | 3/2001 | Glynn et al. | |
| 6,422,817 B1 | 7/2002 | Jacala | |
| 6,471,479 B2 | 10/2002 | Starkweather | |
| 6,595,748 B2 * | 7/2003 | Flodman et al. | 416/97 R |
| 6,672,836 B2 | 1/2004 | Merry | |
| 6,974,308 B2 | 12/2005 | Halfmann et al. | |
| 6,984,103 B2 | 1/2006 | Lee et al. | |
| 7,131,818 B2 | 11/2006 | Cunha et al. | |

(Continued)

*Primary Examiner* — Igor Kershteyn
(74) *Attorney, Agent, or Firm* — Kinney & Lange, P.A.

(57) ABSTRACT

A cooled airfoil includes a concave pressure wall extending radially from a base to a tip of the airfoil, a convex suction wall connected to the concave pressure wall at a leading edge and a trailing edge spaced axially from the leading edge, and a plurality of cooling channels formed between the concave pressure wall and the convex suction wall and configured to receive a cooling fluid supply from the base of the airfoil. The cooling channels include a leading edge channel extending radially from the base toward the tip, a trailing edge channel extending radially from the base toward the tip and in flow communication with a plurality of trailing edge apertures adapted to exhaust cooling fluid to the exterior of the airfoil, a serpentine cooling circuit including a plurality of channels, and a dedicated up-pass channel extending radially from the base toward the tip between the leading edge channel and the forward most channel of the plurality of channels in the serpentine cooling circuit.

25 Claims, 5 Drawing Sheets

U.S. PATENT DOCUMENTS

| | | |
|---|---|---|
| 7,186,082 B2 * | 3/2007 | Mongillo et al. ........... 416/1 |
| 7,293,961 B2 | 11/2007 | Lee et al. |
| 7,296,973 B2 | 11/2007 | Lee et al. |
| 7,413,001 B2 | 8/2008 | Wang et al. |
| 7,413,407 B2 | 8/2008 | Liang |
| 2003/0133795 A1 | 7/2003 | Manning et al. |
| 2006/0051208 A1 | 3/2006 | Lee et al. |
| 2006/0222493 A1 | 10/2006 | Liang |
| 2007/0147997 A1 * | 6/2007 | Cunha et al. ........... 416/97 R |
| 2007/0231138 A1 | 10/2007 | Levine et al. |

* cited by examiner

TURBINE BLADE INTERNAL COOLING CONFIGURATION

CROSS-REFERENCE TO RELATED APPLICATION(S)

The present application is related to the following copending application filed on the same day as this application: "TRIANGULAR SERPENTINE COOLING CHANNELS" by Edward F. Pietraszkiewicz et al. (U.S. application Ser. No. 12/152.370). This application is incorporated herein by this reference.

BACKGROUND

The present invention relates to gas turbine engine blades. In particular, the present invention relates to the internal cooling configuration of turbine blades.

A gas turbine engine commonly includes a fan, a compressor, a combustor, a turbine, and an exhaust nozzle. During engine operation, working medium gases, for example air, are drawn into and compressed in the compressor. The compressed air is channeled to the combustor where fuel is added to the air and the air/fuel mixture is ignited. The products of combustion are discharged to the turbine section, which extracts a portion of the energy from these products to power the fan and compressor. The fan and compressor together with the energy in the combustion products not used by the turbine to drive the fan and compressor produce useful thrust to power, for example, an aircraft in flight.

The compressor and turbine commonly include alternating stages of rotor blades and stator vanes. Compressor and turbine blades and vanes often include complex, contoured airfoil geometries designed to optimally interact with the working medium gas passing through the engine. Additionally, the operating temperatures of some engine stages, such as in the high pressure turbine stages, may exceed the material limits of the blades and therefore necessitate cooling the blades. Cooled blades may include cooling channels in various configurations through which a coolant, such as compressor bleed air, is directed to convectively cool the blade. Blade cooling channels may be oriented spanwise from the root to the tip of the blade or axially between leading and trailing edges. The channels may be fed by one or more supply channels located toward the root, where the coolant flows radially outward from the root to tip, in what is sometimes referred to as an "up-pass." Alternatively, the channels may be fed by one or more supply channels located toward the tip of the blade, in a so-called "down-pass." In addition to individual up and down passes, some blades include cooling channels in a serpentine configuration consisting of several adjacent up and down-passes proceeding axially forward or aftward through the blade. The blades may also include other cooling features, such as film cooling holes for exhausting the coolant from the cooling channels over the exterior surface of the blade, as well as impingement cooling walls, trip strips, and turbulators.

Prior turbine blade designs have continually sought to decrease blade temperatures through cooling. A particular challenge in prior cooled blades lies in the mid-span of blades including serpentine cooling circuits. The coolant in the final passes of serpentine circuits is relatively hot and has relatively low pressure, because heat has been transferred from the blade to the coolant and pressure has been lost in the coolant as it passes through the circuit. The increased coolant temperatures result in reduced cooling effectiveness/increased temperatures in the blade between the serpentine circuit and the leading edge. Because the leading edge of the blade encounters the hottest working medium gas flow temperatures, it is especially advantageous to cool the leading edge as much as possible. Unfortunately, the increased temperatures of the blade aft of the leading edge, caused for example by the hot temperatures in the final pass of a serpentine circuit, have the effect of counteracting the effectiveness of any leading edge cooling techniques employed. The pressure drop in the coolant in the serpentine circuit presents another common design challenge in prior cooled blades: maintaining a sufficiently high backflow margin ("BFM"). BFM is the difference between the fluid pressure of the coolant in the internal channels of the blade and the local static pressure at, for example, a film cooling exhaust hole. In the event BFM is too low, there is a risk that hot working medium gas will be ingested into the internal channels of the blade, thereby counteracting the effectiveness of cooling the blade. BFM is of particular concern in blades including serpentine cooling circuits, because BFM generally decreases as the coolant flows through the circuit. Although significant advances have been made in cooling configurations, a need still exists to improve the effectiveness of cooled turbine blades.

SUMMARY

A cooled airfoil includes a concave pressure wall extending radially from a base to a tip of the airfoil, a convex suction wall connected to the concave pressure wall at a leading edge and a trailing edge spaced axially from the leading edge, and a plurality of cooling channels formed between the concave pressure wall and the convex suction wall and configured to receive a cooling fluid supply from the base of the airfoil. The cooling channels include a leading edge channel extending radially from the base toward the tip, a trailing edge channel extending radially from the base toward the tip and in flow communication with a plurality of trailing edge apertures adapted to exhaust cooling fluid to the exterior of the airfoil, a serpentine cooling circuit including a plurality of channels, and a dedicated up-pass channel extending radially from the base toward the tip between the leading edge channel and the forward most channel of the plurality of channels in the serpentine cooling circuit.

DETAILED DESCRIPTION

Figure 1:
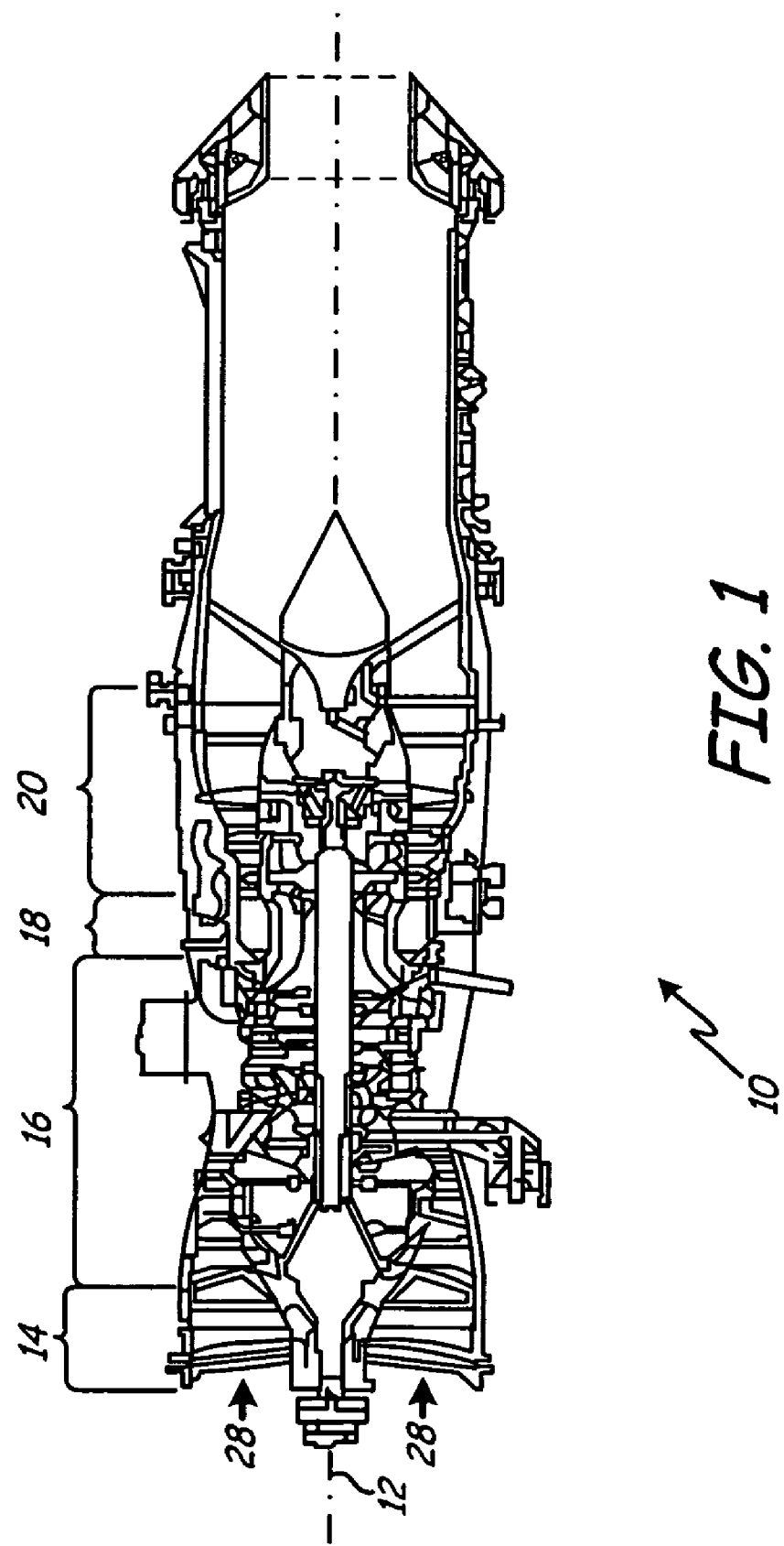
FIG. 1 is an axial cross-section of a gas turbine engine including cooled blades according to the present invention.

FIG. 1 is an axial cross-section of gas turbine engine 10 including engine axis 12, fan 14, compressor 16, combustor 18, and turbine 20. Fan 14 includes a casing surrounding a rotor to which is attached fan blades. Gas stream 28, for example a stream of air, is pulled into the front of engine 10 by fan 14, by the rotation of the fan blades about axis 12. Fan 14 directs gas stream 28 into compressor 16. Gas stream 28 is successively compressed through stages of compressor 16 and directed into combustor 18. Gas stream 28 is mixed with fuel and ignited in combustor section 18. The gas and fuel mixture ignited in combustor section 18 is directed into turbine 20 in which the mixture is successively expanded through alternating stages of turbine rotor blades and stator vanes. A portion of the gas and fuel mixture leaving combustor 18 acts to rotate turbine 20, which powers fan 14 and compressor 16. The remaining portion of the gas and fuel mixture passing through turbine 20 exits the back of engine 10 to provide thrust for engine 10. Due to the high operating temperature of some stages of engine 10, such as the high pressure turbine stages immediately aft of combustor 18, the blades and vanes may be cooled using, for example, air bled from compressor 16.

Figure 2:
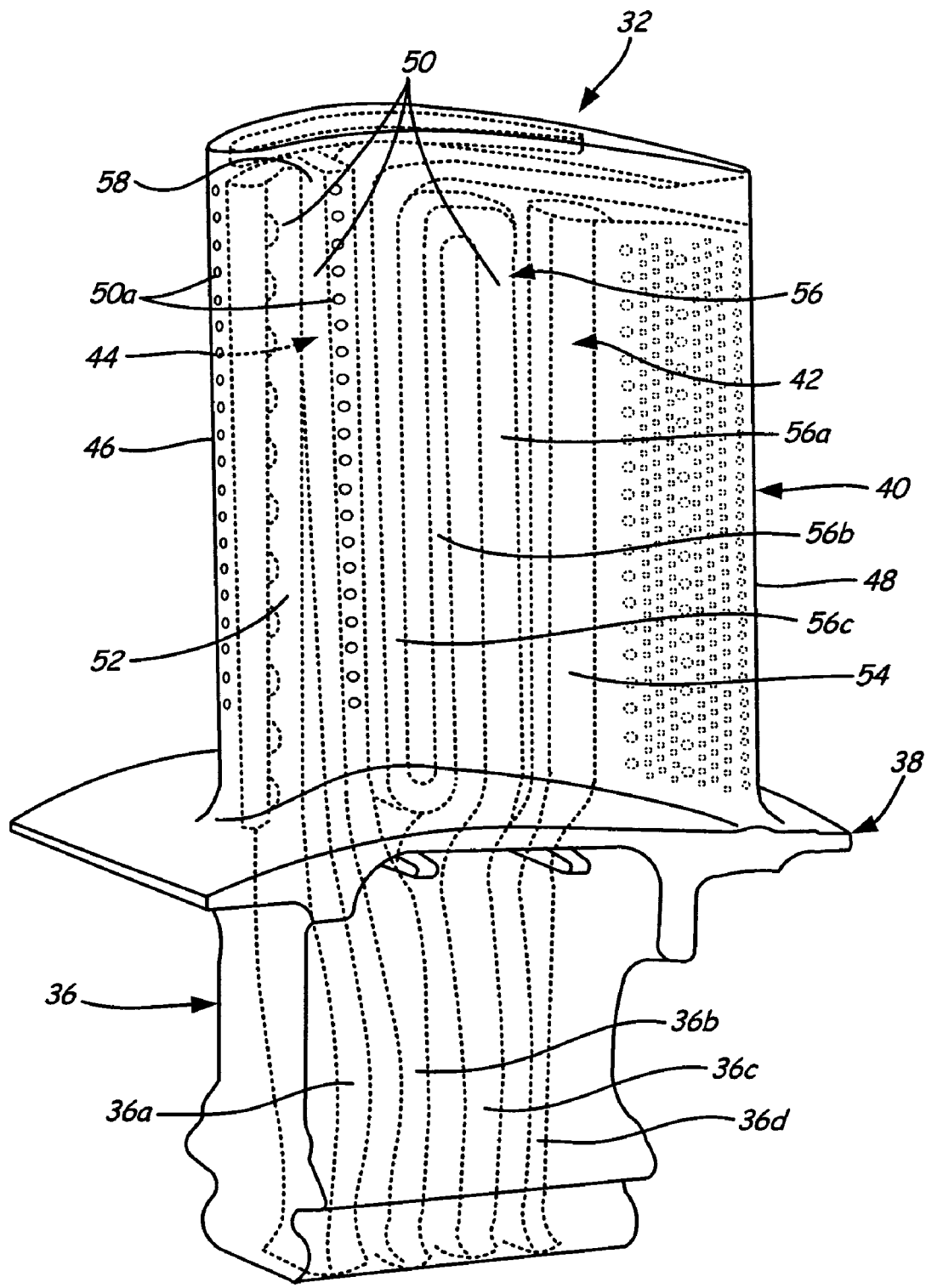
FIG. 2 is a perspective view of a cooled blade employed in the gas turbine engine of FIG. 1.

FIG. 2 is a perspective view of cooled blade 32 according to the present invention, which includes root 36, platform 38, and airfoil 40. Blade 32 may be, for example, a high pressure turbine blade. Root 36 of blade 32 may include a dovetail or fir tree geometry configured to be received in a slot in the rim of a rotor disc. Root 36 includes four cooling fluid supply channels 36a, 36b, 36c, and 36d. Platform 38 is integral with and radially outward of root 36. Supply channels 36a, 36b, 36c, and 36d extend through platform 38 into airfoil 40. Airfoil 40 of blade 32 extends radially from platform 38 to the tip of blade 32. Airfoil 40 includes concave pressure wall 42, convex suction wall 44, and cooling channels 50. Concave pressure wall 42 extends radially from the base to the tip of airfoil 40. Convex suction wall 44 is connected to concave pressure wall 42 at leading edge 46 and trailing edge 48 spaced axially from leading edge 46. Concave pressure wall 42 and convex suction wall 44 may include film cooling apertures, such as film cooling holes 50a, adapted to exhaust cooling fluid from cooling channels 50 onto the exterior surface of airfoil 40.

Cooling channels 50 are formed between concave pressure wall 42 and convex suction wall 44 and configured to receive cooling fluid from supply channels 36a, 36b, 36c, and 36d. Cooling channels 50 include leading edge channel 52, trailing edge channel 54, serpentine cooling circuit 56, and dedicated up-pass channel 58. Leading edge channel 52 extends radially from the base toward the tip of airfoil 40 and is in flow communication with supply channel 36a. Trailing edge channel 54 extends radially from the base toward the tip and is in flow communication with supply channel 36d and trailing edge apertures, such as holes and/or slots, adapted to exhaust cooling fluid to the exterior of airfoil 40. Serpentine circuit 56 includes first channel 56a, second channel 56b, and third channel 56c. First channel 56a is forward of and adjacent to trailing edge channel 54 and extends radially from the base toward the tip of airfoil 40. First channel 56a is in flow communication with supply channel 36c. Second channel 56b is in flow communication with first channel 56a and extends radially adjacent the tip toward the base of airfoil 40. Third channel 56c is in flow communication with second channel 56b and extends radially from the base toward the tip of airfoil 40. Dedicated up-pass channel 58 extends radially from the base toward the tip of airfoil 40 between leading edge channel 52 and third channel 56c of serpentine circuit 56 and is in flow communication with supply channel 36b.

During engine operation, blade 32 may be cooled using, for example, air bled from compressor 16 shown in FIG. 1. Compressor bleed air is fed to supply channels 36a, 36b, 36c, and 36d in root 36 of blade 32. Air flows radially outward through supply channel 36a into leading edge channel 52 inside airfoil 40. Air also flows radially outward through supply channel 36d into trailing edge channel 54 and may be exhausted to the exterior of airfoil 40 through trailing edge exhaust apertures, such as holes and/or slots. Air flows radially outward through supply channel 36c into first channel 56a of serpentine circuit 56. The air flow in serpentine circuit 56 continues from first channel 56a into second channel 56b and third channel 56c. Finally, the remaining portion of compressor bleed air flows radially outward through supply channel 36b into dedicated up-pass channel 58. Blade 32 is convectively cooled, as the relatively cool air fed from the compressor flows through cooling channels 50 in airfoil 40. Additionally, blade 32 may include film cooling holes in concave pressure wall 42 and convex suction wall 44 adapted to exhaust cooling fluid from one or more of cooling channels 50 to the exterior surfaces of airfoil 40, thereby creating a thin layer of cooling fluid that insulates airfoil 40 from the hot working medium gas flowing over blade 32.

Many factors affect the cooling of gas turbine engine blades and vanes, such as blade 32. A constant challenge in turbine blade design is reducing the temperature of the blade as much as possible through the use of coolant and in particular reducing the temperature of the blade in critical areas such as the leading edge. Cooled blades and vanes according to the present invention, such as blade 32 shown in FIG. 2, generally decrease temperatures in different regions by interposing a dedicated up-pass channel between the leading edge and a serpentine cooling circuit. For example, dedicated up-pass channel 58 is supplied with cooling fluid directly from a cooling fluid supply. The relatively cool fluid in dedicated up-pass channel 58 will therefore decrease temperatures inside blade 32, as well as on the exterior of blade 32 through film cooling. Additionally, dedicated up-pass channel 58 reduces the number of channels necessary in serpentine cooling circuit 56, thereby generally decreasing temperature in circuit 56, and insulates leading edge 46 from the relatively hot cooling fluid in third channel 56c of serpentine circuit 56.

Another common challenge in internally cooled blades is maintaining a sufficiently high BFM, which is the difference between the fluid pressure of the coolant in the internal channels of the blade and the local static pressure at, for example, a film cooling exhaust hole. In the event the BFM is too low, there is a risk that hot working medium gas will be ingested into the internal channels of the blade and thereby counteract the effectiveness of cooling the blade. BFM is of particular concern in blades including serpentine cooling channels, because the pressure of the coolant drops as the flow progresses through the up and down-pass channels of the serpentine cooling circuit. Embodiments of the present invention, such as blade 32 shown in FIG. 2, increase BFM in the mid-span of the blade by providing a dedicated up-pass cooling channel in conjunction with a serpentine cooling circuit with fewer up and down-pass channels. For example, high fluid pressure in dedicated up-pass channel 58 is maintained, because channel 58 is fed directly by supply channel 36b in root 36 of blade 32. Additionally, the presence of dedicated up-pass channel 58 reduces the number of up and down-pass channels necessary in serpentine circuit 56, thereby maintaining relatively higher fluid pressure in first, second, and third channels 56a, 56b, 56c of serpentine circuit 56.

Figure 3:
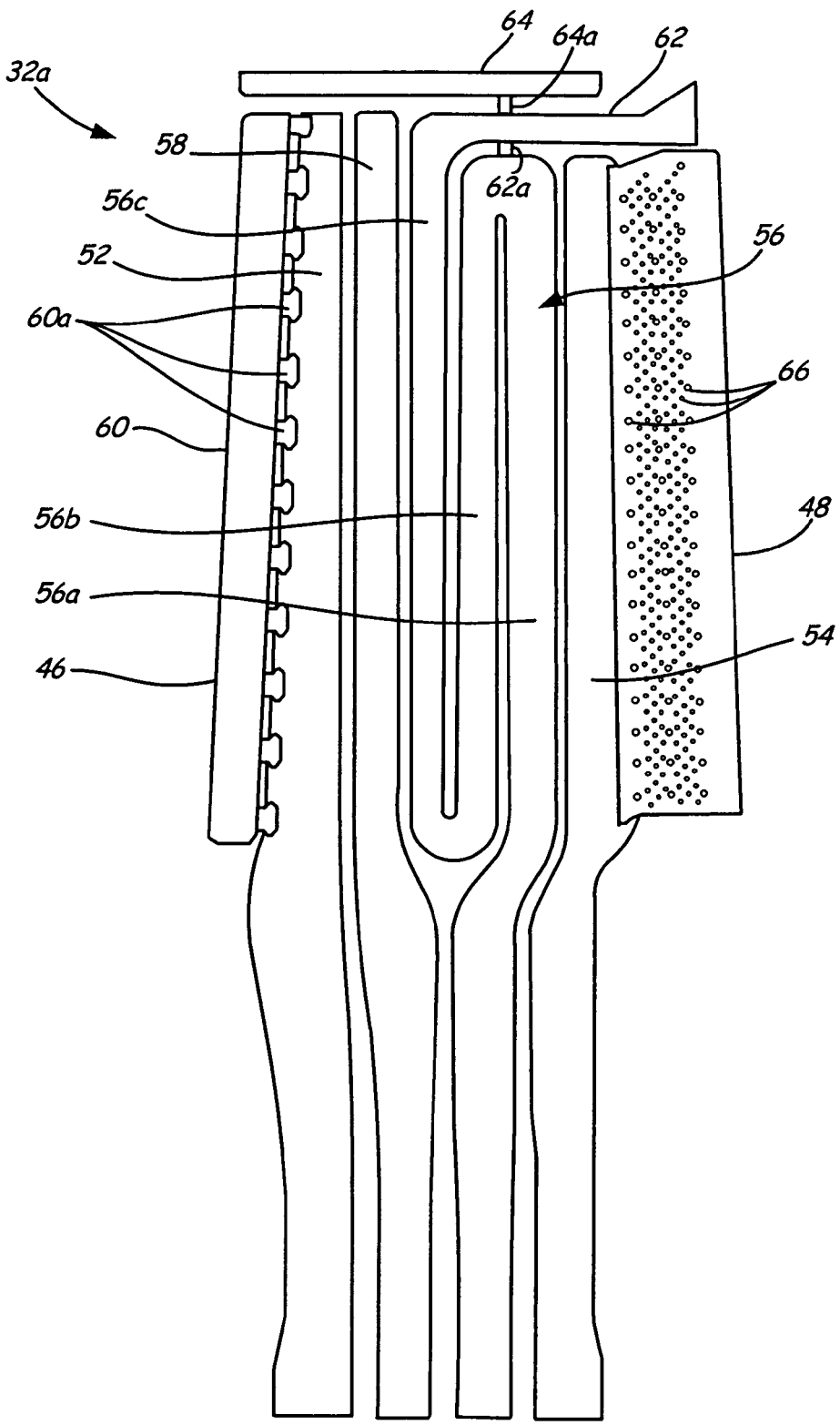
FIG. 3 is a plan view of an internal core of the cooled blade of FIG. 2.

FIG. 3 is a plan view of internal core 32a of blade 32 showing additional features of the cooling configuration of blade 32. In addition to previously discussed cooling channels 50, blade 32 includes leading edge cavity 60, axial channel 62, tip pocket 64, and trailing edge pedestals 66. Leading edge cavity 60 is forward of and in flow communication with leading edge channel 52 through cross-over apertures 60a. Leading edge cavity 60 may also include exhaust apertures adapted to exhaust cooling fluid from leading edge cavity 60 to the exterior of airfoil 40 along leading edge 46. Axial channel 62 is arranged adjacent the tip of airfoil 40 and is in flow communication with and extending aftward from third channel 56c of serpentine circuit 56 toward trailing edge 48.

Axial channel 62 may terminate at a tip exhaust aperture in flow communication with axial channel 62 and the exterior of airfoil 40 adjacent trailing edge 48 toward the tip of blade 32. Core 32a may include core tie 62a connecting axial channel 62 to the junction between first and second channels 56a, 56b of serpentine circuit 56. Core tie 62a increases the stability of core 32a, especially at axial channel 62, during manufacturing processes, such as investment casting. Tip pocket 64 is a depression in the tip of airfoil 40 and may aid in cooling the tip of airfoil 40 by being supplied cooling air from one of the channels inside blade 32. As with axial channel 62, tip pocket 64 may be connected to core 32a at axial channel 62 by core tie 64a. Finally, trailing edge channel 54 may include pedestals 66 arranged in columns spaced axially from one another. Pedestals 66 extend across trailing edge channel 54 from concave pressure wall 42 to convex suction wall 44 of airfoil 40. Cooling fluid flows into trailing edge channel 54 and over pedestals 66 before being exhausted through trailing edge apertures, such as holes and/or slots. Pedestals 66 may act to increase convective cooling of blade 32 by adding surface area across which the cooling fluid flows in the region of trailing edge 48.

Figure 4A:
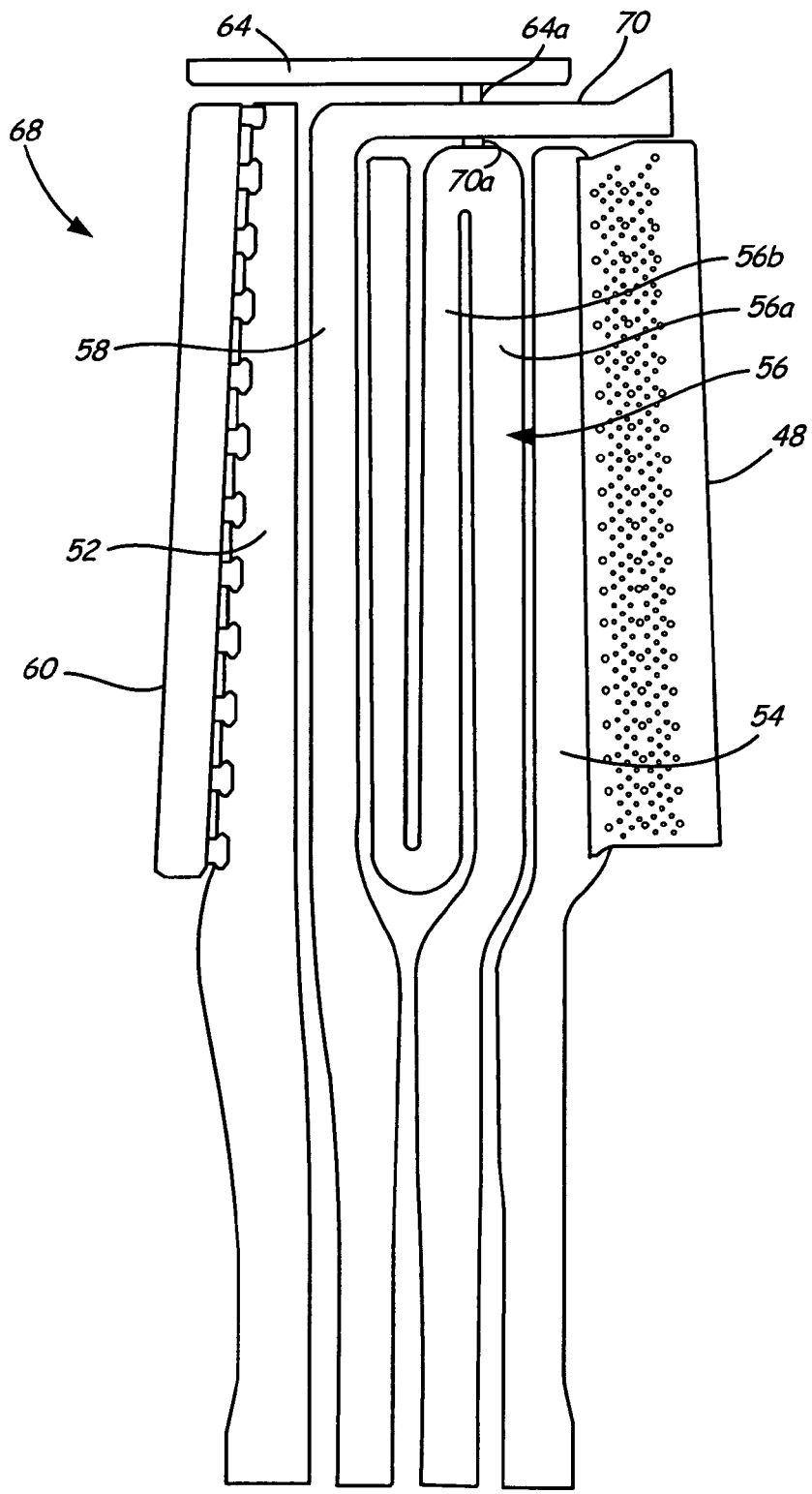
FIGS. 4A and 4B are plan views of the internal core of alternative embodiments of cooled blades according to the present invention.
Figure 4B:
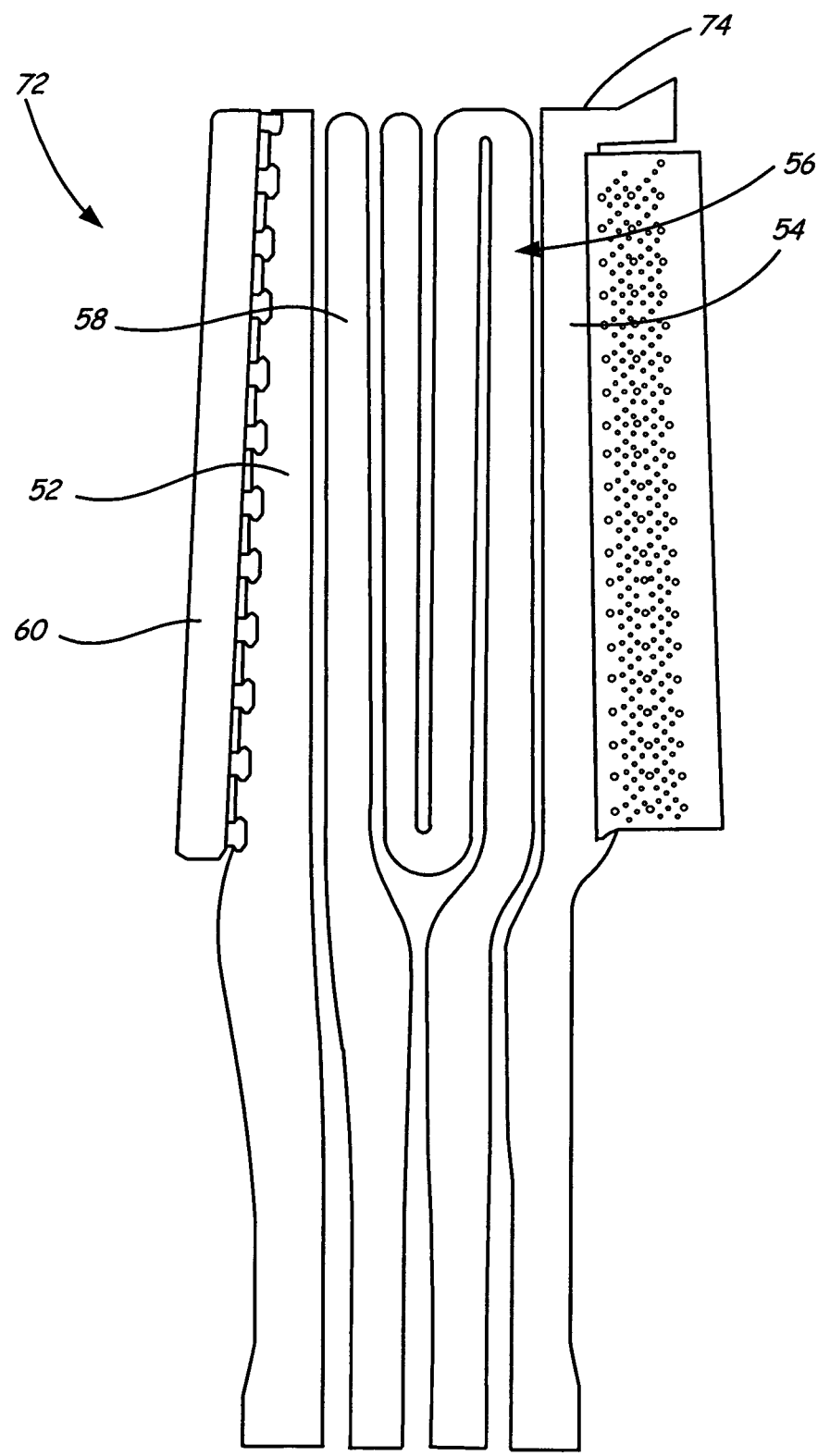

FIGS. 4A and 4B are plan views of the internal core of alternative embodiments of cooled blades according to the present invention. FIG. 4A shows internal core 68 including axial channel 70. In FIG. 4A, axial channel 70 is arranged adjacent the tip of airfoil 40 and is in flow communication with and extending aftward from dedicated up-pass channel 58 toward trailing edge 48. Axial channel 70 may terminate at a tip exhaust aperture in flow communication with axial channel 70 and the exterior of airfoil 40 adjacent trailing edge 48 toward the tip of blade 32. Core 68 may also include core tie 70a connecting axial channel 70 to the junction between first and second channels 56a, 56b of serpentine circuit 56. FIG. 4B shows internal core 72 including axial channel 74. In FIG. 4B, axial channel 74 is arranged adjacent the tip of airfoil 40 and is in flow communication with and extending aftward from trailing edge channel 54.

Cooled blades and vanes according to the present invention have several advantages over prior gas turbine engine blades and vanes. Embodiments of the present invention generally increase film cooling effectiveness and reduce blade temperatures in the mid-span of the blade through decreased cooling fluid temperature in the dedicated up-pass channel and the final up-pass of the serpentine circuit. Also significant, is the insulating effect on the leading edge cooling channel and cavity from relatively high temperatures in the final pass of the serpentine circuit by the interposition of the dedicated up-pass channel between the leading edge and the serpentine circuit. Finally, embodiments of the present invention increase BFM in the mid-span of the blade by providing a dedicated up-pass cooling channel in conjunction with a serpentine cooling circuit with fewer up and down-pass channels. Specifically, high fluid pressure, and therefore increased BFM, in the dedicated up-pass channel is maintained, because the channel is fed directly by a supply channel in the root of the blade. The presence of the dedicated up-pass channel also reduces the number of up and down-pass channels that may be necessary in the serpentine cooling circuit, thereby maintaining relatively higher fluid pressure in the respective up and down-pass channels of the serpentine cooling circuit.

Although the present invention has been described with reference to preferred embodiments, workers skilled in the art will recognize that changes may be made in form and detail without departing from the spirit and scope of the invention.

The invention claimed is:

1. A cooled airfoil comprising:
   a concave pressure wall extending radially from a base to a tip of the airfoil;
   a convex suction wall connected to the concave pressure wall at a leading edge and a trailing edge spaced axially from the leading edge; and
   a plurality of cooling channels formed between the concave pressure wall and the convex suction wall and configured to receive a cooling fluid supply from the base of the airfoil, the cooling channels comprising:
      a leading edge channel extending radially from the base toward the tip;
      a trailing edge channel extending radially from the base toward the tip and in flow communication with a plurality of trailing edge apertures adapted to exhaust cooling fluid to an exterior of the airfoil;
      a serpentine cooling circuit including a plurality of channels comprising:
         a first channel forward of and adjacent to the trailing edge channel and extending radially from the base toward the tip;
         a second channel in flow communication with the first channel and extending radially adjacent the tip toward the base; and
         a third channel in flow communication with the second channel and extending radially from the base toward the tip;
      a dedicated up-pass channel extending radially from the base toward the tip between the leading edge channel and the forward most channel of the plurality of channels in the serpentine cooling circuit;
      an axial channel arranged adjacent the tip and in flow communication with and extending aftward from one of the third channel of the serpentine cooling circuit, the dedicated up-pass channel, or the trailing edge channel toward the trailing edge, wherein the axial channel is further in flow communication with the serpentine cooling circuit upstream of the third channel; and
      a tip pocket comprising a depression in the tip of the airfoil, the tip pocket being in flow communication with the axial channel.

2. The airfoil of claim 1 further comprising a tip exhaust aperture in flow communication with the axial channel and the exterior of the blade adjacent the trailing edge toward the tip.

3. The airfoil of claim 1, wherein the trailing edge channel further comprises a plurality of pedestals arranged in a plurality of radial columns axially spaced from one another.

4. The airfoil of claim 1 further comprising a plurality of film cooling apertures in flow communication with one or more of the leading edge channel, the trailing edge channel, one or more of the plurality of channels in the serpentine cooling circuit, and the dedicated up-pass channel and an exterior surface of one or both of the concave pressure wall and the convex suction wall.

5. The airfoil of claim 1 further comprising one or more leading edge cavities forward of and in flow communication with the leading edge channel through a plurality of crossover apertures.

6. The airfoil of claim 5 further comprising a plurality of leading edge film cooling apertures adapted to exhaust cooling fluid from one or more of the leading edge cavities to the exterior of the airfoil.

7. The airfoil of claim 1 wherein:
the axial channel extends from the third channel of the serpentine cooling circuit; and
the axial channel is in flow communication with the serpentine cooling circuit upstream of the third channel at the junction of the first and second channels.

8. The airfoil of claim 1 wherein:
the axial channel extends from the dedicated up-pass channel; and
the axial channel is in flow communication with the serpentine cooling circuit upstream of the third channel at the junction of the first and second channels.

9. A gas turbine blade comprising:
a root including a plurality of radially extending supply channels;
a concave pressure wall extending radially from the root to a tip of the blade;
a convex suction wall connected to the concave pressure wall at a leading edge and a trailing edge spaced axially from the leading edge;
a plurality of cooling channels formed between the concave pressure wall and the convex suction wall and configured to receive cooling fluid from the plurality of supply channels in the root, the cooling channels comprising:
a leading edge channel extending radially from the root toward the tip;
a trailing edge channel extending radially from the root toward the tip and in flow communication a plurality of trailing edge apertures adapted to exhaust cooling fluid to an exterior of the blade;
a serpentine cooling circuit including a plurality of channels comprising:
a first channel axially forward of and adjacent to the trailing edge channel and extending radially from the root toward the tip and in flow communication with one of the supply channels;
a second channel in flow communication with the first channel and extending radially adjacent the tip toward the root; and
a third channel in flow communication with the second channel and extending radially from the root toward the tip;
a dedicated up-pass channel extending radially from the root toward the tip between the leading edge channel and one of the plurality of channels of the serpentine cooling circuit;
an axial channel arranged adjacent the tip and in flow communication with and extending aftward from one of the third channel of the serpentine cooling circuit, the dedicated up-pass channel, or the trailing edge channel toward the trailing edge, wherein the axial channel is further in flow communication with the serpentine cooling circuit upstream of the third channel; and
a tip pocket comprising a depression in the tip of the blade, the tip pocket being in flow communication with the axial channel.

10. The blade of claim 9 further comprising a tip exhaust aperture in flow communication with the axial channel and the exterior of the blade adjacent the trailing edge toward the tip.

11. The blade of claim 9, wherein the trailing edge channel further comprises a plurality of pedestals arranged in a plurality of radial columns axially spaced from one another.

12. The blade of claim 9 further comprising a plurality of film cooling apertures in flow communication with one or more of the leading edge channel, the trailing edge channel, one or more of the plurality of channels in the serpentine cooling circuit, and the dedicated up-pass channel and an exterior surface of one or both of the concave pressure wall and the convex suction wall.

13. The blade of claim 9 further comprising one or more leading edge cavities forward of and in flow communication with the leading edge channel through a plurality of cross-over apertures.

14. The blade of claim 13 further comprising a plurality of leading edge film cooling apertures adapted to exhaust cooling fluid from one or more of the leading edge cavities to the exterior of the airfoil.

15. The blade of claim 9, wherein one of the supply channels is in flow communication with only the dedicated up-pass channel and another of the supply channels is in flow communication with only the leading edge channel.

16. The gas turbine blade of claim 9 wherein:
the axial channel extends from the third channel of the serpentine cooling circuit; and
the axial channel is in flow communication with the serpentine cooling circuit upstream of the third channel at the junction of the first and second channels.

17. The gas turbine blade of claim 9 wherein:
the axial channel extends from the dedicated up-pass channel; and
the axial channel is in flow communication with the serpentine cooling circuit upstream of the third channel at the junction of the first and second channels.

18. A gas turbine engine comprising:
one or more rotors each of which rotors comprise a plurality of rotor blades circumferentially arranged about a rotation axis of the engine, wherein one or more of the rotor blades comprise:
a root including a plurality of radially extending supply channels;
a concave pressure wall extending radially from the root to a tip of the blade;
a convex suction wall connected to the concave pressure wall at a leading edge and a trailing edge spaced axially from the leading edge;
a plurality of cooling channels formed between the concave pressure wall and the convex suction wall and configured to receive cooling fluid from the supply channels in the root, the cooling channels comprising:
a leading edge channel extending radially from the root toward the tip;
a trailing edge channel extending radially from the root toward the tip and in flow communication with a plurality of trailing edge apertures adapted to exhaust cooling fluid to an exterior of the blade;
a serpentine cooling circuit including a plurality of channels channels comprising:
a first channel axially forward of and adjacent to the trailing edge channel extending radially from the root toward the tip and in flow communication with one of the supply channels;
a second channel in flow communication with the first channel and extending radially adjacent the tip toward the root; and
a third channel in flow communication with the second channel and extending radially from the root toward the tip;
a dedicated up-pass channel extending radially from the root toward the tip between the leading edge channel and one of the plurality of channels of the serpentine cooling circuit;

an axial channel arranged adjacent the tip and in flow communication with and extending aftward from one of the third channel of the serpentine cooling circuit, the dedicated up-pass channel, or the trailing edge channel toward the trailing edge, wherein the axial channel is further in flow communication with the serpentine cooling circuit upstream of the third channel; and a tip pocket comprising a depression in the tip of the blade, the tip pocket being in flow communication with the axial channel.

19. The engine of claim 18 further comprising a tip exhaust aperture in flow communication with the axial channel and the exterior of the blade adjacent the trailing edge toward the tip.

20. The engine of claim 18 further comprising a plurality of film cooling apertures in flow communication with one or more of the leading edge channel, the trailing edge channel, one or more of the plurality of channels in the serpentine cooling circuit, and the dedicated up-pass channel and an exterior surface of one or both of the concave pressure wall and the convex suction wall.

21. The engine of claim 18 further comprising one or more leading edge cavities forward of and in flow communication with the leading edge channel through a plurality of crossover apertures.

22. The engine of claim 21 further comprising a plurality of leading edge film cooling apertures adapted to exhaust cooling fluid from one or more of the leading edge cavities to the exterior of the airfoil.

23. The engine of claim 18, wherein one of the supply channels is in flow communication with only the dedicated up-pass channel and another of the supply channels is in flow communication with only the leading edge channel.

24. The gas turbine engine of claim 18 wherein:

the axial channel extends from the third channel of the serpentine cooling circuit; and the axial channel is in flow communication with the serpentine cooling circuit upstream of the third channel at the junction of the first and second channels.

25. The gas turbine engine of claim 18 wherein:

the axial channel extends from the dedicated up-pass channel; and the axial channel is in flow communication with the serpentine cooling circuit upstream of the third channel at the junction of the first and second channel.

* * * * *